Oct. 16, 1962   M. W. LOVELAND ET AL   3,058,616
DEVICE FOR FEEDING PEACHES AND THE LIKE
Filed Jan. 6, 1961   2 Sheets-Sheet 1

ROWLAND F. BLAKEWELL
THEODORE M. HARRER
MALCOLM W. LOVELAND
INVENTORS

BY
ATTORNEYS

ROWLAND F. BLAKEWELL
THEODORE M. HARRER
MALCOLM W. LOVELAND
INVENTORS

United States Patent Office 3,058,616
Patented Oct. 16, 1962

3,058,616
DEVICE FOR FEEDING PEACHES AND THE LIKE
Malcolm W. Loveland and Theodore M. Harrer, Orinda, and Roland F. Blakewell, Oakland, Calif., assignors to Atlas Pacific Engineering Company, a corporation of California
Filed Jan. 6, 1961, Ser. No. 81,046
2 Claims. (Cl. 221—175)

This invention relates to an article feeding device, particularly one for feeding fruit such as peaches and the like.

Machines are available for orienting fruit such as peaches and thereafter cutting the peach into halves along their suture line and finally removed the pit. These machines heretofore have been fed by hand, a relatively time consuming and expensive operation. In accordance with this invention we provide a fruit feeding device which successfully takes fruit from a bulk supply and places it in single file order so that the fruit can be fed one-at-a-time to such a subsequent processing machine.

It is in general a broad object of the present invention to provide an improved fruit feeding device particularly suited for the feeding of objects such as peaches and the like.

We have found that if one lifts several articles from a bulk supply by movement of a supporting surface only sufficient in extent to support a series of the articles in single file, such articles can thereafter be removed from the lifting device in single file order and moved on in that order to a subsequent processing machine. Thus, we provide a device which includes a movable conveyor for receiving the articles in single file from a movable plunger which moves through a bulk supply to lift a series of articles and deposit there on the conveyor which then moves them on in single file to the processing machine.

The invention includes other objects and features of advantage, some of which, together with the foregoing, will appear hereinafter wherein the present preferred form of feeder is disclosed.

In the drawings accompanying and forming a part hereof:

Figures 1, 2:
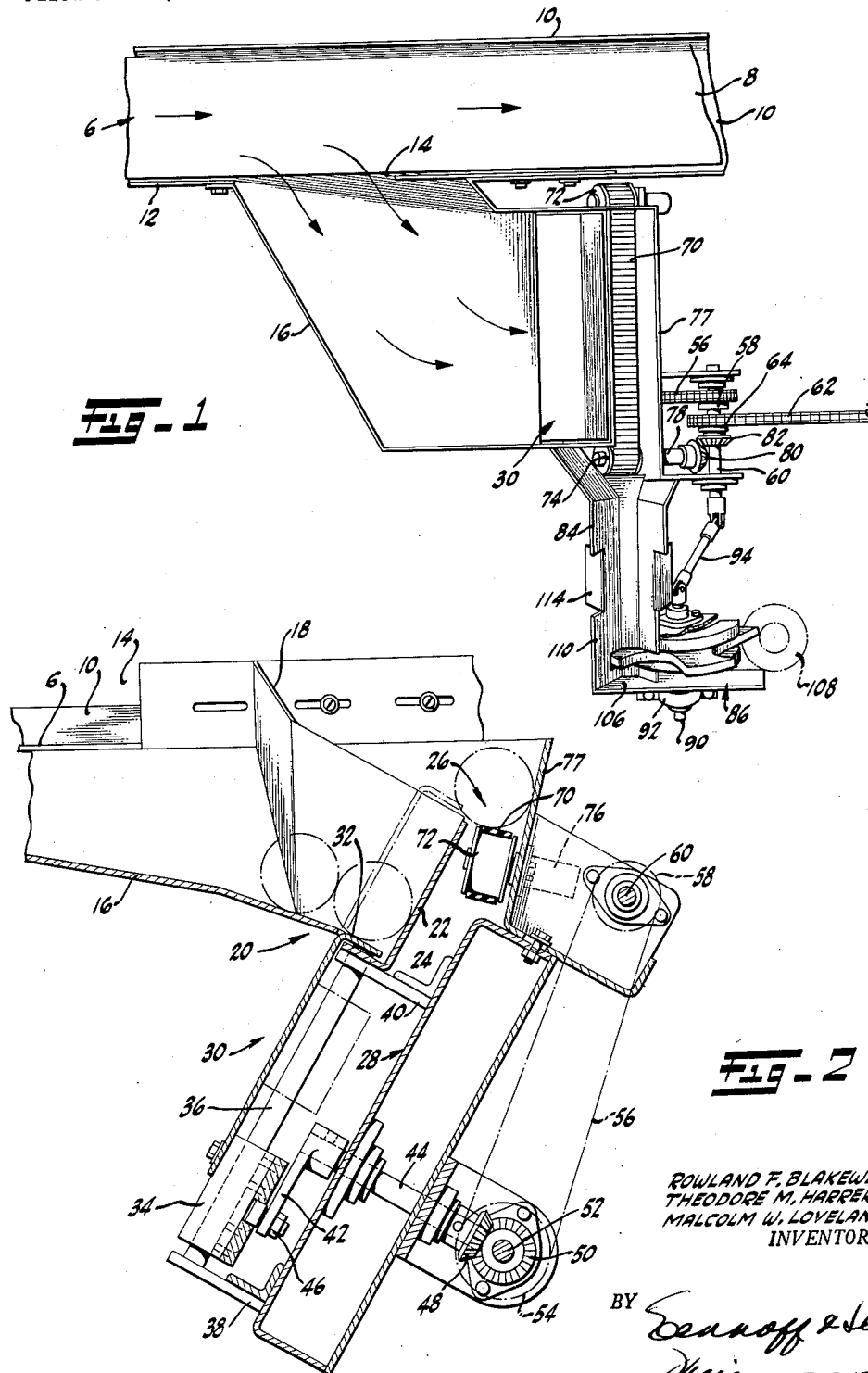
FIGURE 1 is a plan view of an improved feeder embodying the present invention.
FIGURE 2 is a side elevation partly in section to illustrate the construction.

Referring to the drawings and particularly to FIGURE 1, a feeding conveyor generally indicated at 6 is provided including a belt 8 movable over a bottom support 10 and between confining side walls 10 and 12. Side wall 12 has suitable spaced openings 14 therein through which fruit can move off the conveyor 6 upon a downwardly extending chute 16. Chute 16 also includes an arcuate side wall 18 which, together with the chute, directs articles delivered from the bulk supply on conveyor 6 to a loading station generally indicated at 20. At the loading station an upwardly extending wall 22 is provided extending from a first level 24 at the feed station 20 to a discharge station 26 at the top of wall 22. Wall 22 is supported on a suitable frame, generally indicated at 28.

A piston strutcure generally indicated at 30 is movable across the wall 22 from the loading station 20 at the first level 24 to the discharge station 26 at the top of wall 22. The piston is mounted for reciprocation upon a slideable bearing support 34, the latter being movable on guide rods 36 supported between brackets 38 and 40 on the frame or support structure 28. A crank-arm 42 is employed to reciprocate the piston. The crank-arm is mounted at one end on shaft 44, while its other end is engaged as at 46 with the slideable support 34 for the piston. Shaft 44 is driven by a mitre gear 48 enmeshed with another mitre gear 50 on end of shaft 52. Sprocket 54 on shaft 52 is driven by a chain 56 trained about another sprocket 58 provided upon a drive-shaft 60. Shaft 60 is driven by a chain 62 extending to a sprocket 64 on the shaft 60, the chain extending to a sprocket on a suitable prime mover or other source of power. Usually, the feeding device is driven directly from some type of processing machine in a timed relation to the operation of such processing machine such as a peach orientation device.

To remove fruit delivered to the discharge station 26, we provide a belt conveyor 70 trained about an idler pulley 72 and a drive pulley 74. Pulley 72 is supported on a suitable bearing 76 mounted on a wall 77 on the frame 28. Pulley 74 is mounted upon a shaft 78 mounted in a suitable bearing (not shown), shaft 78 being driven by a mitre gear 80 off another mitre gear 82 on the shaft 60.

Figure 3:
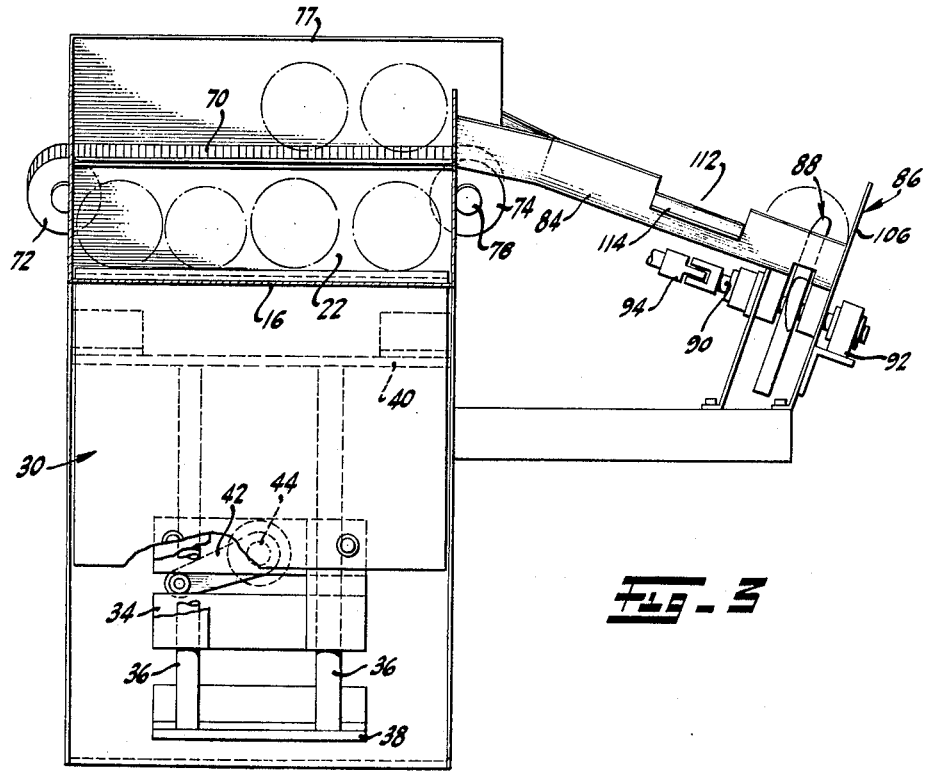
FIGURE 3 is a view taken normal to the piston.
Figure 4:
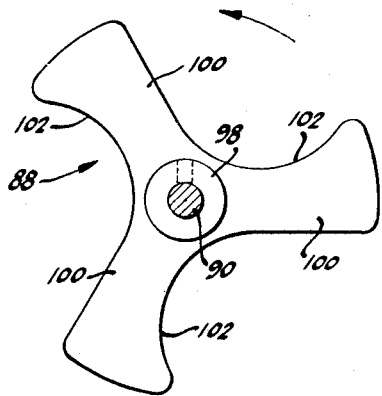
FIGURE 4 is a plan view of a loading wheel controlling release of an article.

Fruit delivered by the conveyor belt 70 to its discharge is received in a downwardly extending chute 84 (FIGURE 3) leading to a discharge station generally indicated at 86. At the discharge station, a star wheel generally indicated at 88 is provided. The star wheel is mounted upon a shaft 90 supported in a suitable bearing 92 and driven from the shaft 60 by the universally mounted shaft connection 94. As appears in FIGURE 4, the star wheel includes a hub 98 from which three separate arms 100 extend radially. The forward or leading edge of each arm is arcuately formed as at 102 to provide a pocket for reception of an article.

In operation, the star wheel turns at right angles to the chute 84 and serves to lift an article resting against the end wall 106 at the discharge station 86 out of the chute into some form of receiving device such as fruit transfer means generally indicated at 108.

It is to be noted that side walls 110 defining the downward portion of chute 84 are interrupted as at 112 and include outwardly and downwardly flaring portions 114. If the articles being fed back up in the chute 84 to the point where they reach the openings 112, the articles are free to roll through the openings 112 and so relieve any congestion while ensuring continuous feeding of the star wheel; as has been set forth, the star wheel operates in a timed relationship to some processing machine.

In operation, a plurality of articles will come tumbling down onto chute 16 from the feed conveyor 6. When the piston 30 is in its depressed or loading position 20, a row of these articles will roll onto top 32 of the piston. The top of the piston is sized to suit generally the articles handled. For example, in FIGURES 2 and 5, the relationship shown is that which exists between an average size peach and the top of the piston. A row of articles will thus come to rest in single file upon the top of the piston. When the latter is raised, these articles will be rolled across the wall 22 to the discharge station 26 at which they will come to rest, being partly supported by the wall 77 and the belt conveyor 70. The belt conveyor will then move them as a unitary mass but in single file to the chute 84, whence they will roll down for feeding one-at-a-time by the star wheel. In this manner, the articles are placed in single file and are fed from such single file order one-at-a-time to a suitable processing machine.

Figure 5:
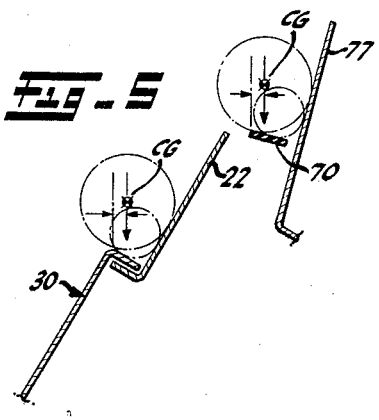
FIGURE 5 is a diagrammatic view illustrating the feeding operation.

The area of the piston top is preferably such that the largest fruit will be just balanced with its center of gravity slightly within the upper corner of the piston as is shown in FIGURE 5. It should not be so wide that two rows of the smallest fruit can rest on the top of the piston. These same observations apply to the width of the conveyor belt 70 and its supporting shelf as is shown in FIGURE 5.

It is preferred to overfeed the star wheel since this ensures that it will always deliver a fruit to the subsequent processing machine. This overfeeding is ensured by operating the piston and the belt conveyor at a rate such that slightly more fruit is delivered than the star wheel will accept. For example, in one machine the plunger was reciprocated at 25 strokes per minute delivering four large peaches at a time or 100 per minute, the peaches being each approximately four inches in diameter. The star wheel was operated at 20 r.p.m. and so delivered 60 peaches per minute out of the 100 delivered from the conveyor belt 70 in the chute 110. The excess ensured that the processing machine always operated at full capacity, excess fruit passing through the opening 112 and over the lip 114 provided on the side wall 110 on the chute 84 being returned by a conveyor (not shown) for feeding through the machine.

From the foregoing, we believe it is apparent that we have provided a new and useful feeding device for segregating a substantially predetermined number of articles from a random mass thereof and for feeding the articles so segregated in single file order.

We claim:

1. A fruit feeding device comprising a single file conveyor having a major and a minor axis, the major axis of the conveyor being substantially horizontal and the minor axis being at an acute angle to the horizontal, a bulk supply bin for fruit to be fed, a lift of a width only sufficient to support a single row of said fruit having a planar top and being reciprocated back and forth over a path extending at an acute angle to the vertical and between a first position in which fruit in the bin moves onto said planar top and a second position in which fruit on the planar top rolls onto the conveyor, a chute for receiving articles discharged by said conveyor and extending downwardly to a discharge station, and a star wheel for feeding articles one at a time from said discharge station.

2. A fruit feeding device comprising a single file conveyor having a major and a minor axis, the major axis of the conveyor being substantially horizontal and the minor axis being at an acute angle to the horizontal, a bulk supply bin for fruit to be fed, a lift of a width only sufficient to support a single row of said fruit having a planar top and being reciprocated back and forth over a path extending at an acute angle to the vertical and between a first position in which fruit in the bin moves onto said planar top and a second position in which fruit on the planar top rolls onto the conveyor, a chute for receiving articles discharged by said conveyor and extending downwardly to a discharge station, a star wheel for feeding articles one at a time from said discharge station, and an article over-flow provided in the chute for releasing articles arriving at said discharge station in excess of those fed by said star wheel.

References Cited in the file of this patent
UNITED STATES PATENTS

| | | |
|---|---|---|
| 1,696,803 | Kronqvist | Dec. 25, 1928 |
| 2,667,961 | Reese | Feb. 2, 1954 |

FOREIGN PATENTS

| | | |
|---|---|---|
| 1,071,920 | France | Sept. 7, 1954 |